(No Model.)
G. A. HECKMANN.
SCARF FASTENER.
No. 545,157. Patented Aug. 27, 1895.
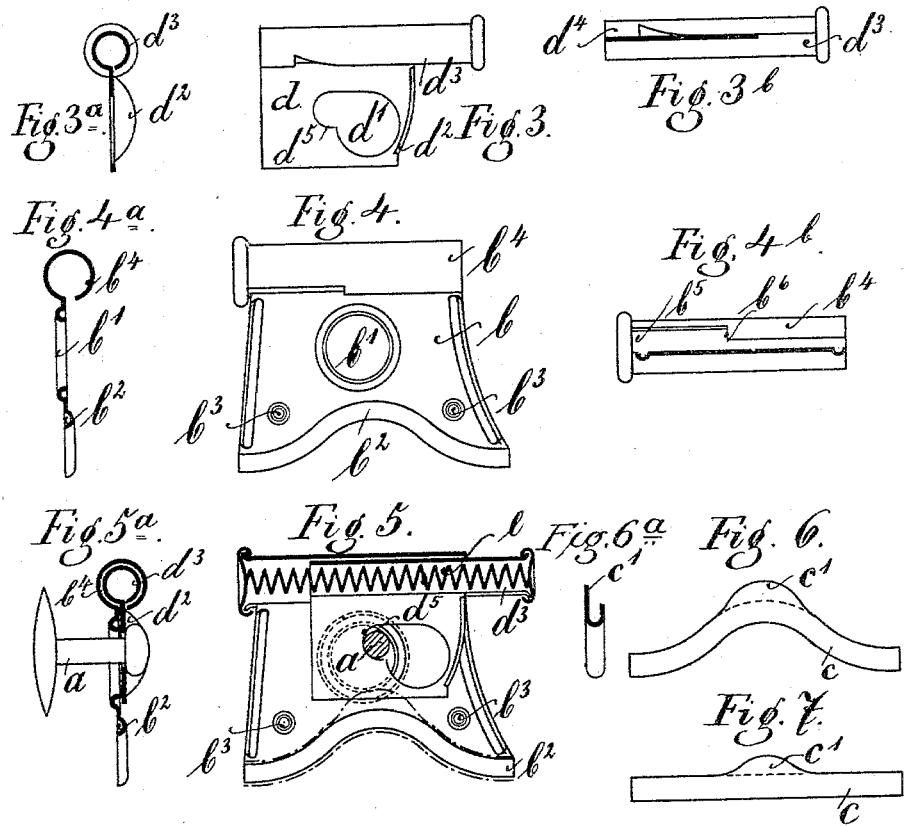
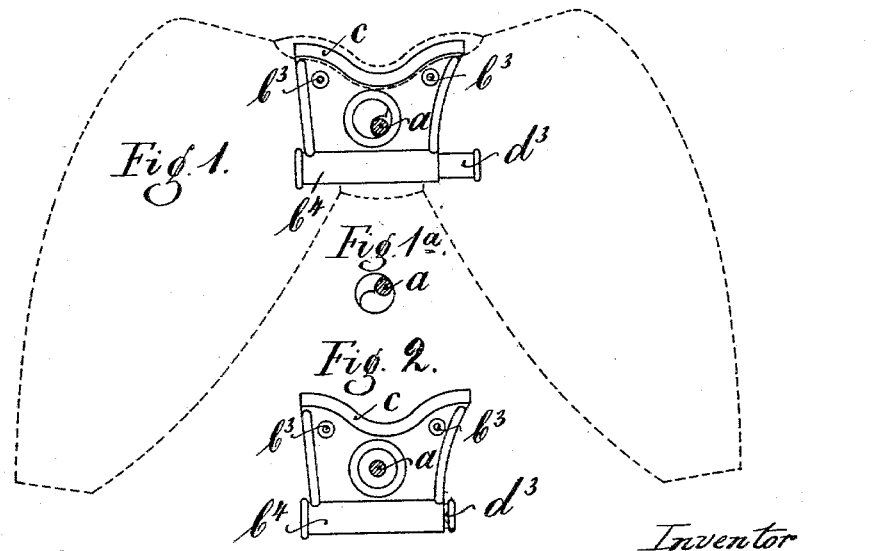
Witnesses
A. J. Madden
O. F. Salke
Inventor
G. A. Heckmann
by A. J. Madden
Attorney

UNITED STATES PATENT OFFICE.

GUSTAV ADOLF HECKMANN, OF BARMEN, GERMANY.

SCARF-FASTENER.

SPECIFICATION forming part of Letters Patent No. 545,157, dated August 27, 1895.

Application filed April 2, 1895. Serial No. 544,206. (No model.)

*To all whom it may concern:*

Be it known that I, GUSTAV ADOLF HECKMANN, a subject of the Emperor of Germany, and a resident of Barmen, in the Empire of Germany, have invented a certain new and useful Improved Scarf-Fastener, of which the following is a specification.

This invention relates to an improved scarf-fastener, and is illustrated in the annexed drawings, in which—

Figure 1 is an elevation showing the fastener fixed to a scarf (shown in dotted lines) and likewise illustrating the manner in which said fastener engages the stem $a$ of a collar-stud. Fig. 2 shows the fastener in the position to which its parts are to be brought when the scarf is to be detached from the collar-stud. Figs. 3, $3^a$, $3^b$, 4, $4^a$, $4^b$, 6, $6^a$, and 7 illustrate the different constituent parts of the fastener on a larger scale. Fig. 5 shows the fastener completely fitted together and seen from the opposite sides of Figs. 1 and 2 and partly in section. Fig. $5^a$ is a cross-section showing the collar-stud engaged by the fastener.

The sheet-metal plate $b$, Fig. 1, is provided with a hole $b'$ large enough for inserting the head of the collar-stud. The folded edge $b^2$ serves to secure the fastener onto the scarf, and this is done by first putting the edge of the flap forming the knot or center piece of the scarf into the fold $b^2$. Then the cover-plate $c$, Fig. 6, is slid over, and then the whole is pressed together by means of a stamp. If, now, the flap be turned over and sewed fast with the rest of the scarf, the fastener will be thus firmly connected with the scarf, and, moreover, the forming of a knot of agreeable appearance is materially facilitated, owing to the curved form of the edge of the fastener. The two holes $b^3$ only serve for fixing purposes, in order that any twisting of the fastener may be avoided. The plate $b$ has at its lower edge a tube $b^4$, which is partially left open along its length. (See Fig. $4^a$.) As will be seen from Fig. $4^b$, this tube $b^4$ is further provided with a slot $b^5$, the purpose of which will be further explained hereinafter.

The small plate or slide $d$, Fig. 3, is provided with a hole $d'$, (shown in Fig. 5,) and possesses one upright edge $d^2$, and has at the bottom a tube $d^3$, as shown in Fig. $3^a$. The tube $d^3$ is slotted in such a manner as to form the nose $d^4$, Fig. $3^b$, the purpose of which will be further explained hereinafter in connection with the slot $b^5$ of the tube $b^4$.

Fig. 5 shows the method of combining the different parts, in which $a$ indicates the cross-section of the stem of the collar-stud. The tube $d^3$ is inserted into the tube $b^4$. They inclose inside a spring $e$, which with its one end presses against the end of the tube $d^3$ and with the other against the end of tube $b^4$. Said spring $e$ would when the scarf is taken off tend to push outward the inner tube $d^3$. This, however, is prevented in the following manner: After the tube $d^3$ has been inserted into the tube $b^4$ the nose $d^4$, Fig. $3^b$, is turned over by means of a pointed tool, and thus the inner tube is prevented from being pushed right out by the nose $b^4$ arriving against the edge $b^6$ of the slot $b^5$, Fig. $4^b$. In Fig. 5 the dotted lines indicate the slid-over cover-piece $c$, (shown separately in Fig. 6,) and also shows that the tongue $c'$ of the cover $c$ slightly covers the slide $d$, whereby a lateral displacement of the slide is prevented.

Fig. $6^a$ represents a section through the middle of cover-plate $c$.

Fig. 7 shows the portion $c$ in straight form as being more suitable for stand-up collars. The plate $b$ is under these latter circumstances also made straight.

For securing the scarf on the collar-stud the slide $d$ is by means of the thumb and middle finger pushed into its end position, so that the holes $b'$ $d'$ coincide, and at the same time below the scarf the forefinger is placed upon the coinciding holes, so that the slipping through of the stud can be felt, whereupon the fastener is released and the scarf thus fixed.

The detaching of the scarf is effected by pressing the tube $d^3$ inward by means of the thumb and forefinger so far that the two holes $b'$ and $d'$ again coincide, whereupon the stud can be withdrawn without hinderance. The upwardly-bent edge $d^2$ is intended to push the stud-head right into the middle of the hole $b'$.

The stem $a$ of the collar-stud is shown in the figures in a low position, since the recess $d^5$ of the hole $d'$ offers a reliable holdfast, and is so placed that the scarf occupies a correct position with regard to the collar. In the higher position of the collar-stud, as indicated in Fig. 1ª, the scarf would be also adapted to fit properly.

The plate $b$ may, for obtaining an exact fitting of the scarf, be somewhat bent to the neck of the wearer.

I claim as my invention—

A scarf-fastener comprising in combination two plates $b$ $d$ having orifices $b'$ $d'$ therein respectively, tubular extensions $b^4$, $d^3$, to said plates adapted to slide one within the other, a spring $e$ and a cover plate $c$ adapted to secure the scarf to said fastener substantially as set forth.

In witness whereof I have signed this specification in presence of two witnesses.

GUSTAV ADOLF HECKMANN.

Witnesses:
F. H. STRAUSS,
A. STRAUSS.